April 14, 1964 W. F. HANSEN 3,128,720
MEAT HOOK TROLLEY
Filed April 2, 1963

INVENTOR.
WILLIAM F. HANSEN
BY
ATTORNEYS.

United States Patent Office 3,128,720
Patented Apr. 14, 1964

---

3,128,720
MEAT HOOK TROLLEY
William F. Hansen, Shipman Road, Jerseyville, Ill.
Filed Apr. 2, 1963, Ser. No. 269,985
1 Claim. (Cl. 104—89)

This invention relates to a trolley device and more particularly to a trolley device for suspending meat from an overhead track.

In packing houses and meat storage rooms, meat such as sides of beef are suspended on meat hooks carried by trolleys that are adapted to ride on tracks usually positioned at some substantial height above the floor. Such trolley devices usually include a grooved wheel for riding over the top of the track and a bracket carried by the grooved wheel and extending below the track. At the lower end or terminal portion of the bracket is usually mounted a meat hook on which the meat is carried. The sides of meat are quite heavy and it is not an easy task to manually mount the meat to the meat hook. Nor is it an easy task to remove the meat from the meat hook. In the latter instance, it is quite often necessary to force the meat off of the hook and in doing so, it has been the experience in the past that the trolley sometimes becomes disengaged from the track. When the trolley does become disengaged from the track, it has oftentimes happened that said trolley strikes the worker standing below it. Since the trolley is made of metal and is quite heavy, this can cause a serious accident.

It is an object of this invention to provide a safety device in the form of a latching member which is rotatably mounted to the bracket and can be rotated into one position whereby the latching member is out of engagement with the track and rotated into a second position where it overlies the track. The first position will be assumed when the trolley device is to be mounted to the track. The second position is assumed once the trolley has been mounted on the track. Of course to remove the trolley from the track, the latching member need only be rotated to its first position. However, when the latching member is in its second position whereby it overlies the track, the trolley device is free to ride on the track and the latching member prevents it from falling off of said track. This offers an extremely important safety device particularly when heavy sides of meat are being removed from the meat hook.

Other objects will become apparent from a more detailed description of the accompanying drawings.

Figure 3:
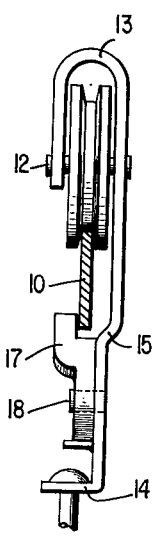
FIGURE 3 is a partial view taken in side elevation partly in section of the trolley device constructed in accordance with this invention.
Figure 4:
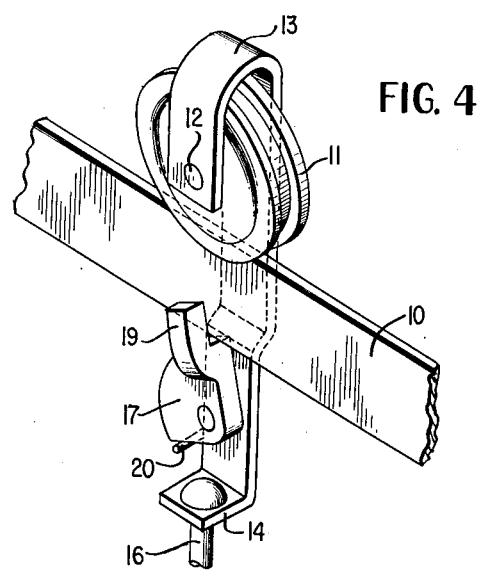
FIGURE 4 is a partial view taken in perspective of the trolley device constructed in accordance with this invention.

Referring now to the figures, on the track 10 is mounted the trolley device constructed in accordance with this invention. It includes a grooved wheel 11 which rides on the overhead track 10. To the wheel 11 and more particularly to the axle 12 thereof is mounted a bracket 13. As can be seen particularly in FIGURES 3 and 4, this bracket 13 extends over the top of the grooved wheel and extends downwardly therefrom to a terminal portion 14. It may be inwardly extending such as at 15. A meat hook 16 is suspended or carried at the terminal portion of the trolley device.

Figure 2:
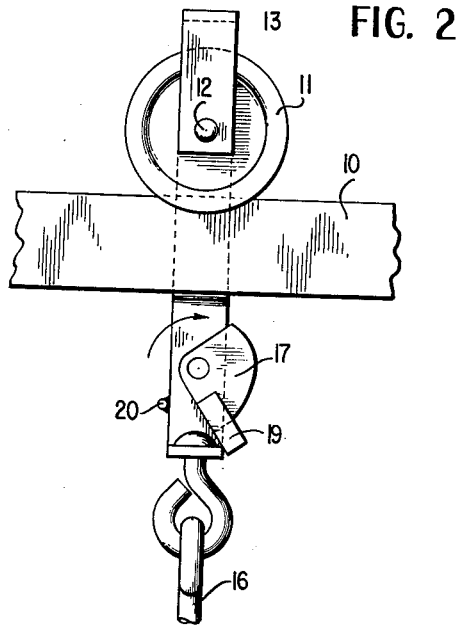
FIGURE 2 is a view similar to FIGURE 1 only showing the latching member in a position whereby it does not overlie the track.

A latching member 17 is pivotally mounted to the bracket at a point thereon so as to accommodate the track 10 between the latching member and the grooved wheel. It may be pivotally mounted on the bracket through the shaft 18. As can be seen in one form the latching member 17 may be substantially arcuate in contour and provided with a projection 19 at one side thereof. As shown in FIGURE 2, the latching member 17 is in what will be called the first position in which it is rotated clockwise so that the projection 19 does not overlie the track 10. It is in this position that the trolley device may be either mounted to the track 10 or taken off of the track 10.

Figure 1:
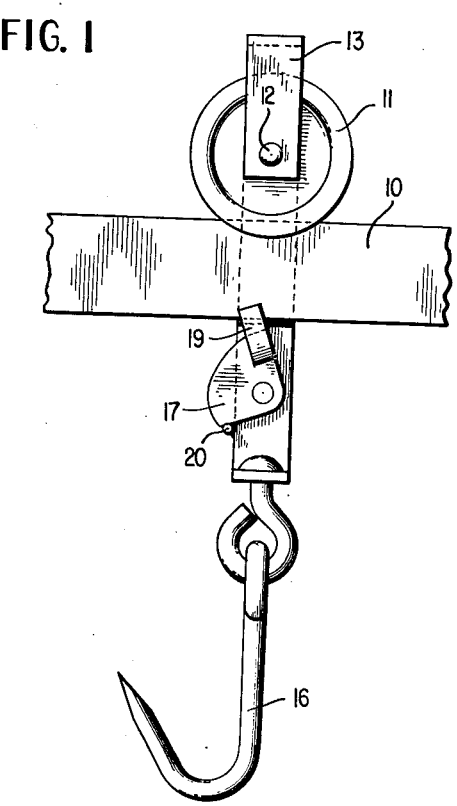
FIGURE 1 is a front elevation of the trolley device constructed in accordance with this invention showing said trolley device mounted on a track and the latching member in a position to overlie said track.

A stop 20 is mounted to the bracket and as can be seen particularly in FIGURE 1 when the latching member 17 is rotated counterclockwise, the stop 20 holds the latching member in a second position whereby the projection 19 overlies the track 10. In this second position, the trolley device is securely mounted on the track 10 whereby it may ride thereon but is prevented from falling off of said track.

Of course, the latching member may take many particular forms or shapes. The functioning of this latching member is the important aspect, that is, it must in one position permit mounting of the trolley device to the track 10 and in a second position prevent the trolley device from falling off of the track 10.

What has been disclosed is one particular embodiment of the present invention. Other embodiments obvious to those skilled in the art from the teachings herein are contemplated to be within the spirit and scope of the following claim.

What is claimed is:

In a trolley device for suspending meat from an overhead track including a grooved wheel to ride on said track, a bracket carried by said wheel and adapted to extend downwardly therefrom and to terminate below said track, a meat hook suspended from the terminal of said bracket, the improvement that comprises a latching member pivotally mounted to said bracket so as to accommodate said track between said latching member and said wheel, said latching member including a projection extending therefrom, a latch stop mounted on said bracket whereby when said latching member is in a first position away from said stop, said projection does not overlie said track and when said latching member is in the second position bearing against said latch stop, said projection does overlie said track to prevent said trolley device from falling off of said track.

References Cited in the file of this patent
UNITED STATES PATENTS

| | | |
|---|---|---|
| 2,566,962 | Ramsey | Sept. 4, 1951 |
| 2,581,948 | Flounders | Jan. 8, 1952 |
| 2,943,581 | Bendik | July 5, 1960 |